United States Patent
Salonaho

(10) Patent No.: US 7,050,823 B1
(45) Date of Patent: May 23, 2006

(54) CONNECTION CONTROL IN A COMMUNICATION SYSTEM

(75) Inventor: Oscar Salonaho, Helsinki (FI)

(73) Assignee: Nokia Corporation, Espoo (FI)

( * ) Notice: Subject to any disclaimer, the term of this patent is extended or adjusted under 35 U.S.C. 154(b) by 222 days.

(21) Appl. No.: 10/049,249

(22) PCT Filed: Aug. 17, 2000

(86) PCT No.: PCT/EP00/08145

§ 371 (c)(1),
(2), (4) Date: Aug. 2, 2002

(87) PCT Pub. No.: WO01/13536

PCT Pub. Date: Feb. 22, 2001

(30) Foreign Application Priority Data

Aug. 18, 1999 (GB) .................................. 9919595

(51) Int. Cl.
*H04B 7/00* (2006.01)
*H04B 7/20* (2006.01)

(52) U.S. Cl. ............. 455/522; 455/69; 455/67.11; 455/67.13; 455/13.4; 455/574; 455/114.2; 455/115.1; 370/332; 370/333; 370/335

(58) Field of Classification Search ........... 455/522, 455/69, 67.11, 67.13, 562.1, 115.1, 114.2, 455/226.1, 226.3, 574; 370/335, 342, 318, 370/332
See application file for complete search history.

(56) References Cited

U.S. PATENT DOCUMENTS

| 5,056,109 | A | * | 10/1991 | Gilhousen et al. .......... 455/522 |
| 5,621,723 | A | * | 4/1997 | Walton, Jr. et al. ......... 370/335 |
| 5,623,484 | A | * | 4/1997 | Muszynski .................. 370/335 |
| 5,722,051 | A | * | 2/1998 | Agrawal et al. .............. 455/69 |
| 5,812,938 | A | * | 9/1998 | Gilhousen et al. ............ 455/69 |
| 5,835,527 | A |   | 11/1998 | Lomp |
| 5,862,489 | A | * | 1/1999 | Aalto .......................... 455/522 |
| 5,914,947 | A | * | 6/1999 | Saito .......................... 370/337 |
| 5,924,043 | A |   | 7/1999 | Takano |
| 6,032,026 | A | * | 2/2000 | Seki et al. .................. 455/63.1 |
| 6,373,823 | B1 | * | 4/2002 | Chen et al. ................... 455/69 |
| 6,405,052 | B1 | * | 6/2002 | Faber .......................... 455/69 |
| 6,490,461 | B1 | * | 12/2002 | Muller ....................... 455/522 |
| 6,493,541 | B1 | * | 12/2002 | Gunnarsson et al. ........ 455/522 |
| 6,529,482 | B1 | * | 3/2003 | Lundby ..................... 370/252 |

FOREIGN PATENT DOCUMENTS

| EP | 0682417 | 11/1995 |
| EP | 0709973 | 5/1996 |
| EP | 0822672 | 2/1998 |
| WO | 9726716 | 7/1997 |
| WO | 0052846 | 9/2000 |

* cited by examiner

*Primary Examiner*—Marceau Milord
(74) *Attorney, Agent, or Firm*—Alfred A. Fressola; Ware, Fressola, Van Der Sluys & Adolphson LLP

(57) ABSTRACT

The present invention relates to a method of controlling at least one transmission parameter of a connection between a transmitting station (BS) and receiving station (MS0. The method comprises the steps of receiving at the receiving station a transmission signal from the transmitting station, determining from the received transmission signal whether there exists a power up requirement or a power down requirement, and monitoring the distribution of the power up and power down requirements over a period. If a predefined form of the distribution is detected, the quality target of the connection is changed. The present invention relates also to an arrangement and a receiving station for implementing the method.

17 Claims, 4 Drawing Sheets

CONNECTION CONTROL IN A COMMUNICATION SYSTEM

FIELD OF THE INTENTION

The present invention relates to a method of controlling at least one transmission parameter of a connection between a transmitting station and a receiving station in a communication system. The invention relates further to an arrangement in a communication system and to a receiving station for use in a communication system.

BACKGROUND OF THE INVENTION

In a mobile telecommunication system, such as a CDMA (Code Division Multiple Access) or WCDMA (Wide-band CDMA) or TDMA (Time division Multiple Access) system, transmission power levels between a base station (BS) and a mobile station (MS) associated with said BS can be continuously adjusted during an ongoing connection between the BS and the MS. This is done in order to provide a sufficient quality for the required transmission power levels as low as possible at the same time. By means of this it is possible to avoid "wasting" any network resources and MS battery resources, and to enable as great a number of mobile stations as possible to communicate simultaneously with the same BS having only limited power resources.

One system of power control is based on Power Control (PC) commands transmitted from one station to another to cause the other station to alter its power. The commands can be transmitted e.g. in a WCDMA closed loop. The closed loop power control mechanism between the BS and MS is used for equalising the power of signals from the MS at the BS input and also for compensating fast power deviations from the nominal level. These closed loop PC (CL PC) commands can be sent both in the uplink (towards the base station) and in the downlink (towards the mobile station), whereafter the BS or the MS will process the received command and reduce/increase its transmission power towards the receiving station (i.e. MS or BS respectively) accordingly.

For example, in the currently proposed WCDMA system it is envisaged that an outer loop PC generated by a radio network controller (RNC) of the WCDMA system will attempt to set the connection quality target (that the closed loop follows) of a physical connection between the BS and MS to be such that the required FER (Frame Error Ratio) target of the connection is met with a minimal connection quality target. The connection quality target can be announced e.g. by means of a so called Eb/No (Signalling Energy/Noise) target or SIR (signal to Interference Ratio) target or a similar parameter indicating some quality measurement for the connection. The relationship is such that the connection quality target (e.g. the SIR target) has to be set such that the FER remains at an appropriate level. The actual connection quality value (e.g. SIR) is then adjusted in accordance with the target value, and should follow any changes in the target value. The idea behind this is that by increasing the connection quality target value the connection quality will increase and the FER will improve.

However, if the FER target cannot be met due to e.g. a limitation in the available transmission power when severe interference or attenuation is predicted, the connection quality target will start increasing even though this rise in the connection quality target will not help in causing a better connection between the MS and the BS. If the power limitation is caused by a temporary lack of power caused by a condition such as slow fading or a temporarily weak connection (if, for instance, the MS is situated temporarily in a tunnel or cellar), the quality target will be unnecessarily high once this condition has been removed. This will result in an excessively high transmitted power until the quality target has returned to its normal (appropriate) level. At the BS side this unnecessarily used power resource could be used for transmission towards other mobile stations. At the MS side this will lead among other things, to unnecessary high power consumption and to a possible disturbance to other radio and/or electronic devices.

To give a more precise example, if the BS runs out of power (i.e. a power limitation situation occurs), then the mobile station MS will experience a higher FER than the set FER target. This will result (if not limited by some means) in an unlimited rise of the SIR target value. In accordance with one exemplifying possibility the average rate per frame of this rise can be given by the formula.

$$\text{rise\_per\_frame} = (\text{FER} - \text{FER}_{th}) \text{ step\_size}$$

where
FER is the actual obtained FER,
$\text{FER}_{th}$ is the FER target and
step_size is the step size of the outer loop algorithm Thus, if the actual FER is 2%, the FER target is 1% and the step size is 0.5 dB the SIR target will in ten seconds (1000 frames) be raised by 1%*1000*0.5 dB=5 dB, which can be considered to be a substantial rise. If the higher FER has been caused by e.g. shadowing and the situation changes suddenly the SIR target will be much too high for a while after this condition ends. In this specific example, the SIR target would decrease gradually back to its appropriate value in approximately 5/0.0005=1000 frames=10 seconds.

Earlier proposals to solve this problem have been based on setting absolute limits on the values of the quality targets. There are, however, some problems associated with this type of solution. Firstly, the set absolute limits have to be relatively loose due to the variations in the required quality target for satisfactory quality of the communication. Secondly, the setting of absolute limits for the MS is problematic due to the fact that the absolute value of the quality value setpoint depends heavily on the used estimation method.

SUMMARY OF THE INVENTION

The embodiments of the present invention aim to at least partially overcome one or several of the disadvantages of the prior art proposals in avoiding an undesired and/nt in the air interface between the transmitting and receiving station.

According to a first aspect, the invention provides a method of controlling at least one transmission parameter of a connection between a transmitting station and receiving station in a communication system comprising:

receiving at the receiving station a transmission signal from the transmitting station;

determining from the received transmission signal whether there exists a power up requirement or a power down requirement;

monitoring the distribution of the power up and power down requirements over a period; and in the event that a predefined form of the distribution is detected, changing quality target for the received signal.

According to a second aspect the invention provides an arrangement for controlling at least one transmission parameter of a connection between a transmitting station and a receiving station in a communication system comprising:

a control unit for determining a power up requirement or a power down requirement;

means for monitoring the distribution of the power up and power down requirements over a period of time; and means for changing a quality target of the transmission in the event that the means for monitoring detect a predefined form of distribution in the monitored distribution.

According to a further aspect, the invention provides a receiving station for use in a communication system, comprising:

means for receiving a signal from a transmitting station;

a control unit for determining a power up requirement or a power down requirement;

means from monitoring the distribution of the power up and power down requirements over a period; and means for generating and transmitting a request for transmission parameter change to the transmitting station in the event that the means for monitoring detect a predefined form of distribution in the monitored distribution.

In a more specific embodiment a transmission power level parameter is also changed. A still more specific embodiment comprises transmitting power control commands between the transmitting station and the receiving station, said power control commands including either the power up or the power down request in accordance with the determined requirement, wherein the step of monitoring the distribution of the power up and the power down requirements comprises monitoring the requests derived from the power control commands. According to one alternative the form of the distribution of the power up and the power down requirements is defined on basis of variations in the Signal Interference Ratio (SIR) target. The transmitting station can be a base station and the receiving station a mobile station, or then vice versa. Said determining of the power up requirement or power down requirement and said monitoring of the distribution can be accomplished at the receiving station, or then said determining of the power up requirement or power down requirement is accomplished at the receiving station and said monitoring of the distribution is accomplished at the transmitting station. The step of changing the transmission parameter may comprise returning the transmission parameter to a predefined or default value. At least some of parameters controlling the transmission parameter of the connection can be transmitted to the receiving and/or transmitting station using mobile networks apparatus. In addition, it is possible to use at least two different sets of control parameters simultaneously when controlling the connection.

Several advantages are obtainable by means of the embodiments of the present invention, as they provide a new type of solution for controlling the connection between transmitting and receiving stations, and for instance, for controlling the connection quality target and/or power levels used for the transmission. By means of the proposed embodiments it is possible to prevent unnecessary high power levels after a temporality weak connection has returned to its normal quality. It is also possible to prevent unnecessary rise in the power level the receiving station asks from the transmitting station in case where it is not possible for the transmitting station to provide any more power.

BRIEF DESCRIPTION OF THE DRAWINGS

The invention and other objects and advantages thereof will now be explained in an exemplifying manner with reference to the annexed drawings, in which.

DETAILED DESCRIPTIONS OF THE DRAWINGS

Figure 1:
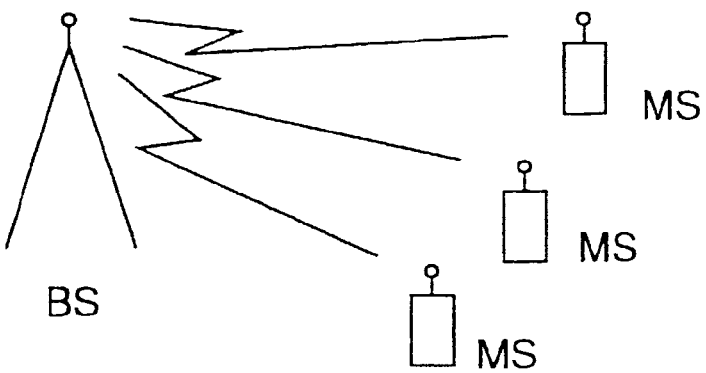
FIG. 1 shows a part of a mobile communication system.

FIG. 1 is a schematic presentation of a part of a mobile communication system, disclosing a base station BS and some mobile stations MS communicating with the BS. The MS could be moveable (e.g. a hand portable mobile phone or a hand portable computer provided with a radio transceiver facility or a communicator) or could be fixed in location (e.g. if the MS is to serve an office at a fixed side) The skilled person is familiar with the operational principles and the various components of a mobile communication system, such as a CDMA system, WCDMA system, FDMA system or a TDMA system providing mobility for the mobile station users thereof, and thus these will not be described in detail. The other parts of a functioning mobile network apparatus have also been omitted from FIG. 1 for the reasons of clarity.

The BS transmits to each of the mobile stations MS with a power level that is adjusted in accordance with, for example, a Power Control (PC) command or similar message received from each of the respective mobile stations MS, that is, the transmission power levels can be different at a given moment between the base station BS and each of the respective mobile stations MS. Correspondingly, each MS transmits towards the BS with a power level adjusted in accordance with particular PC commands transmitted by the BS to that precise MS. For example, in the proposed WCDMA system the PC commands would be transmitted in a WCDMA closed loop. In order to be able to accomplish this functionality, both the BS and the MS are equipped with appropriate control and processing units.

Figure 2:
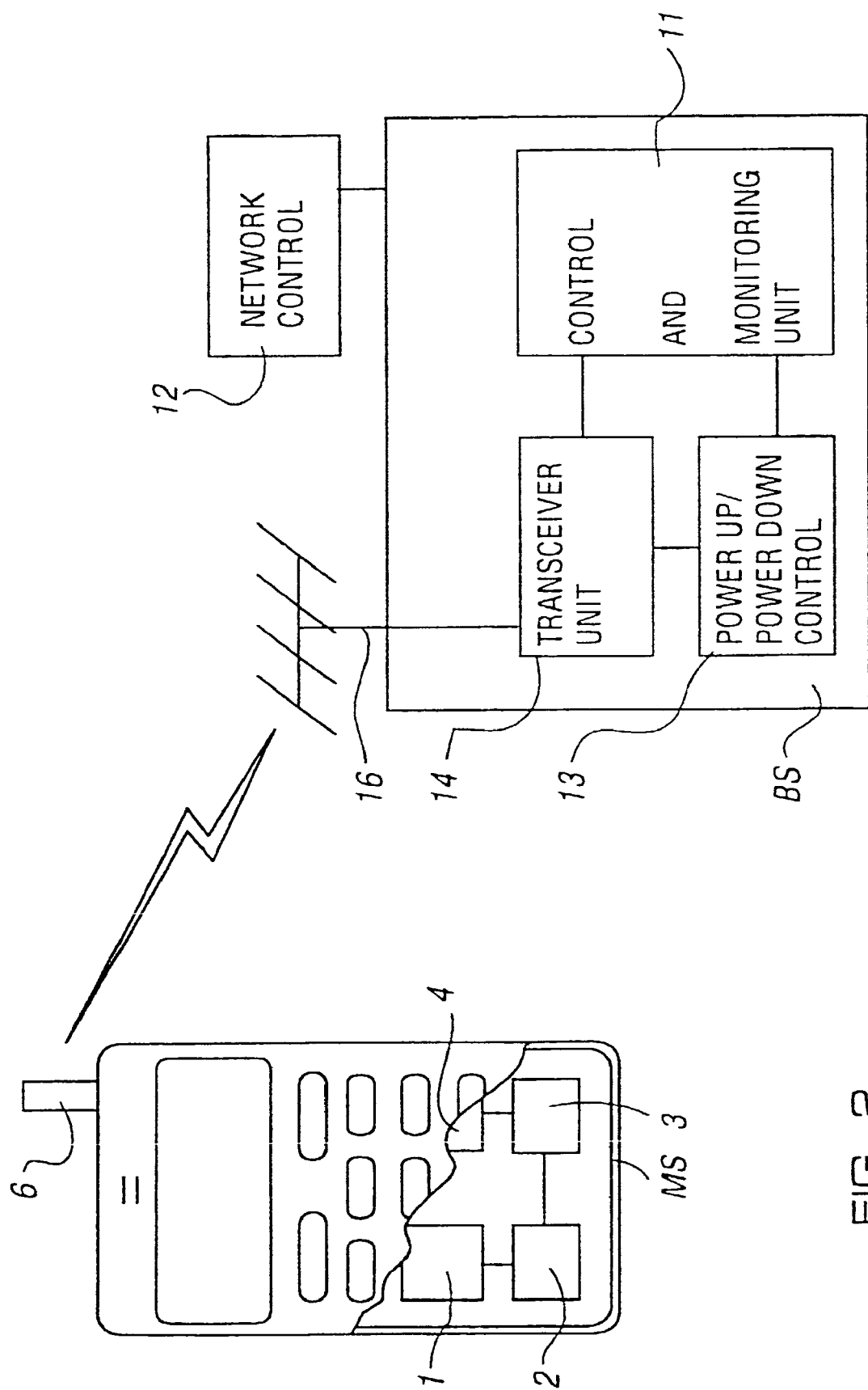
FIG. 2 shows a transmitter-receiver pair.

FIG. 2 shows in more detail one base station and mobile station pair. The mobile station comprises an antenna 6 via which it is arranged to transmit and receive signalling from the base station. The base station comprises correspondingly an antenna 16 via which it is arranged to transmit and receive signalling from the mobile station. The mobile station is capable of transmitting a message (e.g. a closed loop power command) indicating that the quality of the signalling received from the base station is too low or then that the quality is too high. At the base station the message can be received by a transceiver unit 14 from which the message is passed to a power up/down controller 13 controlling the actual transmission power level of the transceiver unit 14. The transceiver unit 14 of the base station may increase the transmission power in order to improve the quality of the signal received at the mobile station end or lessen the transmission power in order to avoid any use of unnecessarily high transmission powers in accordance with instructions received from the unit 13.

The base station includes further a control unit 11. Control unit 11 is arranged to control the received power control commands or similar messages and to monitor the distribution of the power up and power down requests, as will be explained later. It is noted that even though this example shows the controller and the monitoring facility as a single unit 11, they could also be in the form of separated units. It is also to be appreciated that the single unit could also comprise the power up/power down control and/or any other possible control functionalities a transmitting station controller may have. It is noted that the MS may comprise similar functionalities and that monitoring can also be done at the mobile station of FIG. 2, by means of appropriate monitoring and control apparatus 1 to 4 implemented in the MS.

The PC command from the MS and received at the BS may indicate that the transmission power level toward the MS (the receiving station in this example) should go up (power up) or that the transmission power level should go down (power down). In normal operation conditions the average distribution between the determined power up and power down situations should be about 50/50 within a certain predefined period, such a 100 frames or 100 seconds. If the form of the distribution within the period deviates from this, e.g. such that there are 80 requests for "up" and only 20 "down", this 80/20 distribution indicates that for some reason the connection does not meet the quality requirements and that the receiving station (for instance, the control unit, such as a CPU 1, of the mobile station of FIG. 2) keeps on requesting more transmission power so as to improve the quality of the received signal. In an opposite occasion, i.e. when there are 80 requests for "down" and only 20 for "up", this form of distribution will indicate that the connection is far better than required, and the transmission power could thus be reduced more rapidly to the normal level, i.e. to a predefined transmission power default level.

The need for sending a power up or a power down request is determined on the basis of monitoring the quality of the received transmission signal at the receiving station (i.e. either at the BS or the MS). This determination can, for example, be based on monitoring whether the FER (Frame Error Ratio) meets the FER target or not. If not, the SIR (Signal to Interference Ratio) target is raised, and subsequently a power up request is formed and transmitted to the transmitting station in order to improve the quality of the received transmission by increasing the transmission power of the connection. However, if the transmitting station cannot respond to this request, the result is that the receiving station will still suffer from a bad quality connection, and in order to correct the situation it will increment the power requirement e.g. by 0.5 dB. As already explained, this will only lead to an unwanted rise in the target value, and the correction of this "unnatural" situation may take some time.

Figure 3:
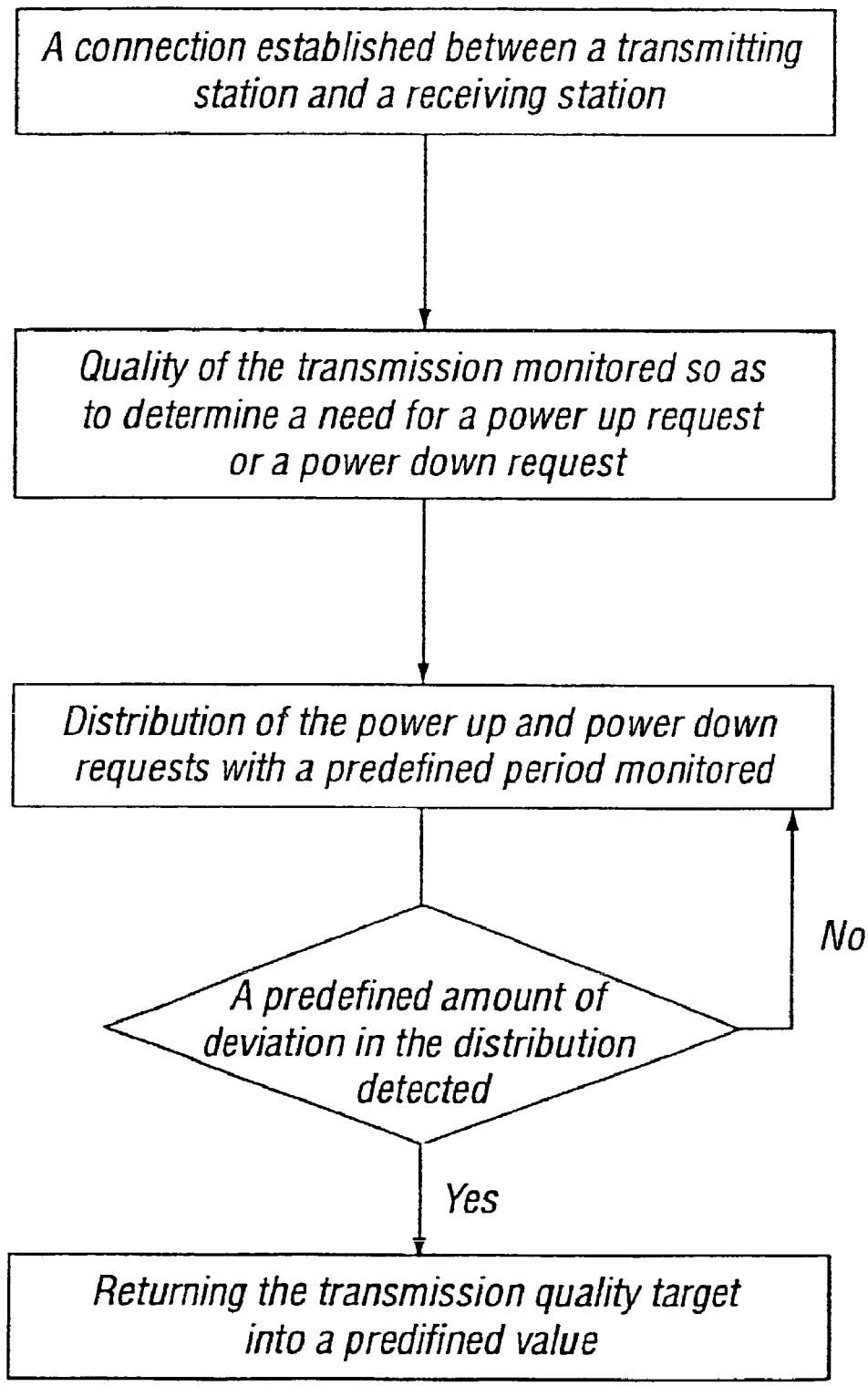
FIG. 3 shows a flow chart in accordance with one embodiment.

As disclosed by the flow chart of FIG. 3, in the proposed solution the quality target (such as the Eb/No target or SIR target) is prevented from rising should a power limitation situation occur by returning a predefined transmission parameter of the connection, such as the power level or quality target to a predefined or default value in case monitoring of distribution of the defined power up and power down needs shows that the form of the distribution deviates a predefined amount from average. According to one alternative this can be accompanied by monitoring the transmitted closed loop PC commands by the monitoring unit 11 (or unit 2 of the mobile station) in order to detect the power up or power down requests from these commands. The monitoring may also occur already at the stage of determining a need for a change in the power level at the receiving station. In any case, the logic here is that if the transmission power is limited at the transmitting station or if the transmitting power is far too high, then the distribution for the transmitted up/down commands will become deviated significantly from an average 50/50 situation in either direction (up/down) at the receiving station, as it keeps on asking more (connection weakened) or less (connection improved) power over a certain predefined period or window.

One algorithm which can be used here is in pseudocode as follows.

$SIR\_old = SIR\_target\ (n)$

Calculate the average amount of transmitted "up" commands during a period of k frames. Then
  IF average>threshold1
    SIR_target (n+k)=SIR old;
  ELSE IF average<threshold2
    SIR_target (n+k)=SIR_old;
  END The threshold values can be set in accordance with predefined control parameters to achieve satisfactory performance. According to one possibility, the control parameters used in the algorithms can be sent to each BS of the system over an Iub interface and/or over the air interface from the BS to the MS. The control parameters can also be centrally updated e.g. by the network operator, e.g. in the case that more/less transmission power resources become available, either temporarily or permanently. Instead of having the control unit within the receiving station, the control unit for this can also be situated in another network or there could be separate control units interfacing the network including the receiving and the transmitting stations.

As can be seen from the above algorithm, when the control unit of the receiving station determines that the form of the distribution deviates more than is allowed from the average distribution, it will immediately return the SIR_target to the predefined SIR_old value, whereafter the operation will continue from this default value, and thereby excessively high target values are avoided in case of limited transmission power and the power level is returned rapidly into a minimal appropriate level should the connection conditions suddenly improve. Even though the quality of the connection does not become better as such by means of this proposal, it does help in removing problems relating to an excessive increase of the target value.

According to one embodiment, if the above algorithm determines the SIR target increase at the BS, this action shall be reported to the radio network controller designated by 12 in FIG. 2 which may then proceed accordingly, e.g. reserve more power resources for that precise transmission or send an appropriate message to the network operator indicating that there are some problems in the power levels or other transmission parameters.

It should be noted, that this type of algorithm can also be used in a concatenated form, i.e. two or more different sets of control parameters can run in parallel. In practice this can be implemented e.g. such that there are two monitoring periods, a shorter one and a longer one, wherein the arrangement is such that in the shorter monitoring period the control parameters are set such that a greater deviation in the distribution is allowed, while the longer period averaging a greater amount of frames allows a smaller amount of deviation in the distribution. By means of using several sets of control parameters it is possible to improve further the system's sensitivity for different types of variations and/or disturbances in the connection.

At present the proposed solution as such is believed to be preferably applicable at the MS end, considering current implementation of network functionalities. However, the solution can be equally implemented at the BS side as well or instead without departing from the scope of the idea. In addition, even though the preferred implementation at the moment is such that the determining of the need for power up or power down requirements and the monitoring of the distribution thereof are both accomplished at the receiving station, this can also be implemented such that only said determining step of the need for power up or power down is accomplished at the receiving station and said monitoring of the distribution is then accomplished at the transmitting station subsequent to having received the power up/power down commands or similar indication of the changed power requirements. In the latter alternative the transmitting station can then, for example, purely ignore the power up requests without any further processing after having detected a deviation in the distribution exceeding a threshold value, or immediately drop the transmitting power in case a power down biased distribution is recognised.

In addition to the deviation of the average, the monitored form of the distribution can also be, for instance, a certain pattern of the power up and power down requirements indicating some special air interface condition. After having detected a predefined form of subsequent power up and power down requirements, the system may change the predefined transmission parameter, such that the quality target or the power level in accordance with predefined parameter values, such as return the quality target or power level to a default (lower) value or to increase the target or power level by more than one "normal" step at once or then "freeze" the parameter to a certain value for some time. This type of distribution form detection can also form part of the concatenated solution whereby the transmission parameter adjustment will be based simultaneously both on the distribution deviation detection and on the distribution pattern detection.

If the adjustment system is biased e.g. such that it will automatically lower the power level or the quality target if no power up requests are received, the form of distribution used in the proposed solution can then be derived from the proportion between the received power up requests and the power down status.

Figure 4:
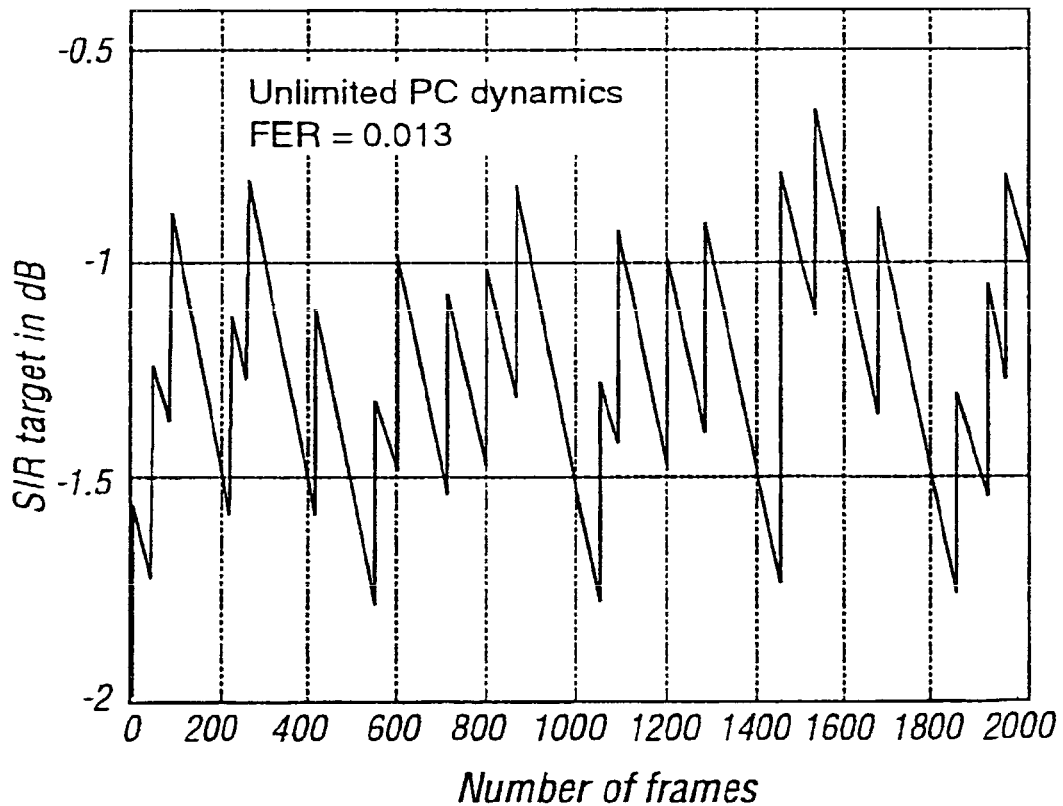
FIGS. 4 to 6 illustrate results of simulations accomplished for the proposed method.
Figure 5:
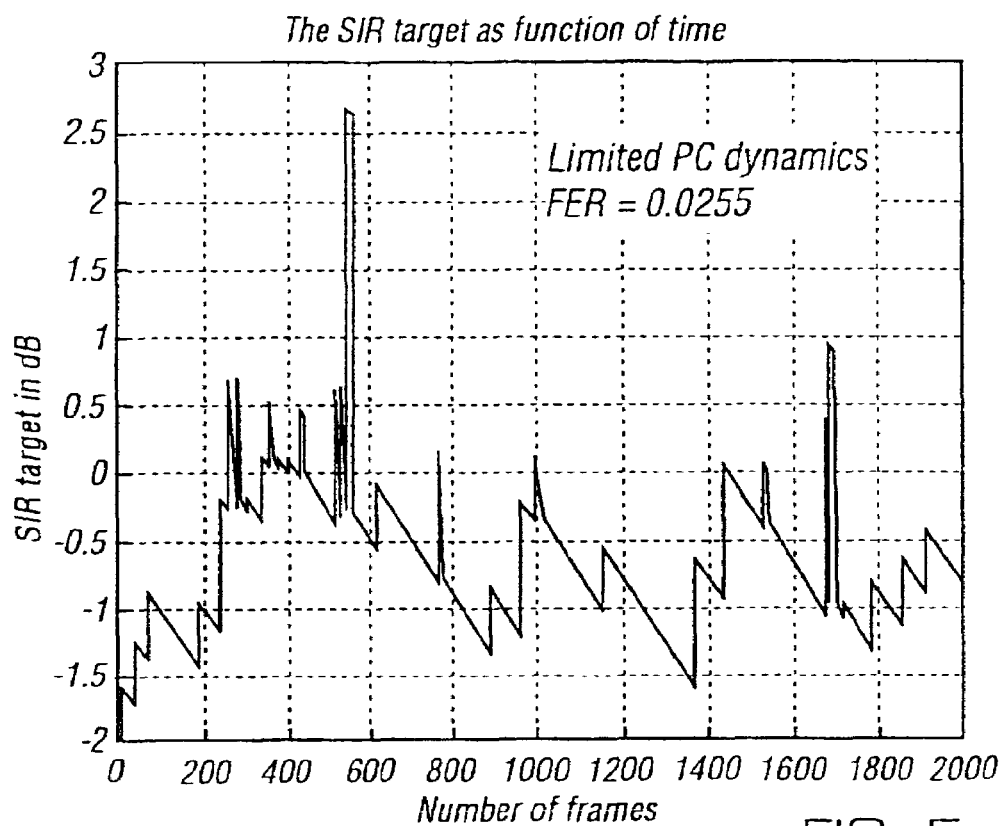
Figure 6:
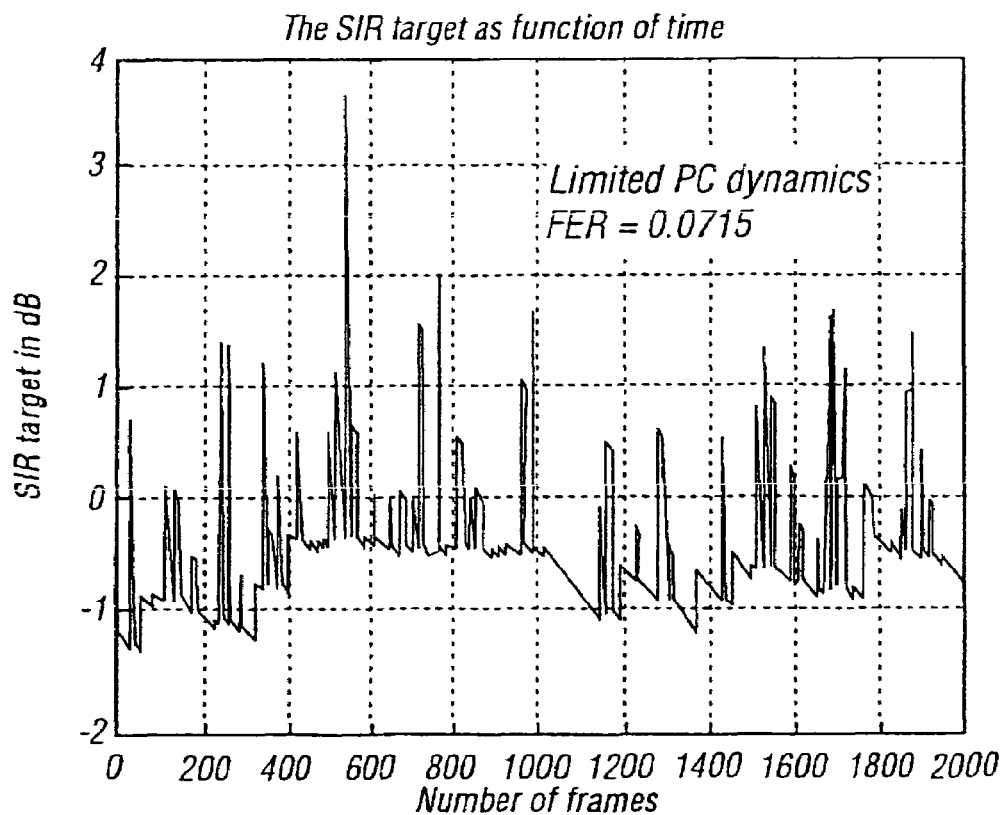

FIGS. 4 to 6 show simulation results for the SIR target as function of time obtained for the above algorithm when simulated with a COSSAP simulator by Synopsys Inc. for three different FER values, which were FER=0.013 (with unlimited PC dynamics), FER=0.0255 (with limited PC dynamics), and FER=0.0715 (with limited PC dynamics), respectively. (The unlimited case assumes that there will be no power limitations whatsoever, whereas in the limited case there is a transmission power limit). In the diagrams the horizontal axis defines the number of frames and the vertical axis defines the SIR target in dB.

In the simulation the PC commands were averaged on 20 frames periods (320 PC commands), and the threshold1 was set to equal 0.6. These parameters leave 0.2×320=64 PC command margin for the UP commands, i.e. the power can rise 64 dB during the average period without the algorithm giving a false alarm (in case the PC commands are otherwise error free). The channel was a 2-tap channel with antenna diversity (uncorrelated antennas) and the used channel speed was 3 km/h.

As can be seen from FIGS. 4 to 6, the algorithm is capable of efficiently cutting the increase in the SIR target value and rapidly returning the power level into a predefined initial value. This can be concluded from the fact that the SIR target will not become raised permanently even in FIG. 6 instance where the FER value is substantially high.

Thus the invention provides a clear advantage over the prior art proposals, as it enables more rapid and dynamic response to the changed transmission conditions and makes it possible to avoid unwanted increases in the connection quality target values in cases where it is not possible to receive any more transmission power.

It is noted herein that while the above describes some embodiments of the present invention there are several variations and modifications which may be made to the disclosed solution without departing from the spirit and scope of the present invention as defined in the appended claims.

What is claimed is:

1. A method of controlling at least one transmission parameter of a connection between a transmitting station and receiving station in a communication system comprising:
   receiving at the receiving station a transmission signal from the transmitting station;
   determining from the received transmission signal whether there exists a power up requirement or a power down requirement;
   monitoring the distribution of the power up and power down requirements over a period of time; and
   in the event that a predefined form of the distribution is detected, changing a quality target for the received signal.

2. A method in accordance with claim 1, comprising changing the power level of the transmission.

3. A method in accordance with claim 1, further comprising;
   transmitting power control commands between the transmitting station and the receiving station, said power control commands including either the power up or the power down request in accordance with the determined requirement, wherein the step of monitoring the distribution of the power up and the power down requirements comprises monitoring the requests derived from the power control commands.

4. A method in accordance with claim 1, wherein the form of the distribution of the power up and the power down requirements is defined on basis of variations in a Signal Interference Ratio (SIR) target.

5. A method in accordance with claim 1, wherein the transmitting station is a base station of a mobile communication system and the receiving station is a mobile station.

6. A method in accordance with claim 1, wherein said determining of the power up requirement or power down requirement and said monitoring of the distribution are accomplished at the receiving station.

7. A method in accordance with claim 1, wherein said determining of the power up requirement or power down requirement is accomplished at the receiving station and said monitoring of the distribution is accomplished at the transmitting station.

8. A method in accordance with claim 1, wherein the step of changing the transmission parameter of the connection comprises returning the transmission parameter of the connection to a predefined value.

9. A method in accordance with claim 1, wherein at least some of control parameters used for controlling the transmission parameter of the connection are transmitted to the receiving and/or transmitting station using radio network apparatus.

10. A method in accordance with claim 9, wherein the control parameters are defined in and/or control parameter updates are transmitted from a separate control unit.

11. A method in accordance with claim 1, comprising simultaneous use of at least two different sets of control parameters used for controlling the connection.

12. An arrangement for controlling at least one transmission parameter of a connection between a transmitting station and a receiving station in a communication system comprising:
   a control unit for determining a power up requirement or a power down requirement from a signal transmitted from the transmitting station;
   means for monitoring the distribution of the power up and power down requirements over a period of time; and
   means for changing a quality target of the transmission in the event that the means for monitoring detect a predefined form of distribution in the monitored distribution.

13. An arrangement in accordance with claim 12, comprising means for changing the power level of the transmission.

14. An arrangement in accordance with claim 12, wherein the means for changing the transmission parameter of the connection are arranged to return the transmission parameter to a predefined value.

15. An arrangement in accordance with claim 12, wherein the receiving station comprises the control unit, the means for monitoring distribution of the power up and the power down requirements and the means for changing the transmission parameter.

16. An arrangement in accordance with claim 12, wherein the transmitting station is a base station and the receiving station is a mobile station.

17. A receiving station for use in a communication system, comprising:
   means for receiving a signal from a transmitting station;
   a control unit for determining a power up requirement or a power down requirement;
   means for monitoring the distribution of the power up and power down requirements over a period of time; and
   means for generating and transmitting a request for a change in a quality target to the transmitting station in the event that the means for monitoring detect a predefined form of distribution in the monitored distribution.

* * * * *

UNITED STATES PATENT AND TRADEMARK OFFICE
CERTIFICATE OF CORRECTION

PATENT NO. : 7,050,823 B1 Page 1 of 1
APPLICATION NO. : 10/049249
DATED : May 23, 2006
INVENTOR(S) : Salonaho It is certified that error appears in the above-identified patent and that said Letters Patent is hereby corrected as shown below:

On Title Page, Item (57) Col. 2
1. In the Abstract, please delete "(MSO" and replace with --(MS)-- therefor.

Signed and Sealed this

Eighth Day of August, 2006

JON W. DUDAS
*Director of the United States Patent and Trademark Office*